(12) United States Patent
Kakuta (10) Patent No.: US 10,129,422 B2
(45) Date of Patent: Nov. 13, 2018

(54) IMAGE READER AND IMAGE FORMING APPARATUS

(71) Applicant: KYOCERA Document Solutions Inc., Osaka (JP)

(72) Inventor: Masayuki Kakuta, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 8 days.

(21) Appl. No.: 15/546,839

(22) PCT Filed: Sep. 29, 2016

(86) PCT No.: PCT/JP2016/078874
§ 371 (c)(1),
(2) Date: Jul. 27, 2017

(87) PCT Pub. No.: WO2017/057604
PCT Pub. Date: Apr. 6, 2017

(65) Prior Publication Data
US 2018/0007220 A1  Jan. 4, 2018

(30) Foreign Application Priority Data
Sep. 30, 2015 (JP) .................................. 2015-194379

(51) Int. Cl.
*H04N 1/00* (2006.01)
*G03G 21/16* (2006.01)
(Continued)

(52) U.S. Cl.
CPC ....... *H04N 1/00551* (2013.01); *G03G 15/607* (2013.01); *G03G 21/16* (2013.01);
(Continued)

(58) Field of Classification Search
CPC .................................................. H04N 1/00551
See application file for complete search history.

(56) References Cited

U.S. PATENT DOCUMENTS 5,338,018 A * 8/1994 Nagao .................... G03G 15/60
 271/273
6,405,017 B1 * 6/2002 Takahashi .............. G03B 27/62
 355/75

(Continued)

FOREIGN PATENT DOCUMENTS

JP 2001-242670 A 9/2001
JP 2005-274810 A 10/2005

*Primary Examiner* — Anthony Nguyen
(74) *Attorney, Agent, or Firm* — IP Business Solutions, LLC (57) ABSTRACT

An image reader includes: a reading section reading a document; a document conveyance section being supported in an openable and closable manner with respect to the reading section; foamed synthetic resin members being supported on a lower surface of the document conveyance section; a document pressing plate being fitted to the document conveyance section with the foamed synthetic resin members in between; and height regulation sections being formed at the document conveyance section and being pressed by second platen glass with the document pressing plate in between, wherein the height regulation sections are located at positions overlapping with a region of the second platen glass when the document conveyance section is in a closed state.

9 Claims, 8 Drawing Sheets

SUB-SCANNING DIRECTION (51) Int. Cl.
*H04N 1/10* (2006.01)
*H04N 1/107* (2006.01)
*G03G 15/00* (2006.01)
*H04N 1/04* (2006.01)

(52) U.S. Cl.
CPC ........... *H04N 1/00* (2013.01); *H04N 1/00559* (2013.01); *H04N 1/04* (2013.01); *H04N 1/10* (2013.01); *H04N 1/107* (2013.01); *H04N 1/1061* (2013.01); *H04N 2201/0094* (2013.01)

(56) References Cited

U.S. PATENT DOCUMENTS

| | | | | |
|---|---|---|---|---|
| 7,676,189 B2* | 3/2010 | Seo | ............... | H04N 1/00519 355/76 |
| 8,265,540 B2* | 9/2012 | Harada | ............ | G03G 15/605 358/474 |
| 2005/0025541 A1* | 2/2005 | Terae | ............ | G03G 15/605 399/380 |
| 2010/0238524 A1* | 9/2010 | Yang | ............ | G03G 15/605 358/498 |

* cited by examiner

IMAGE READER AND IMAGE FORMING APPARATUS

TECHNICAL FIELD

The present invention relates to an image reader which reads a document and an image forming apparatus, and more specifically to a technology for positioning a document pressing section, which is provided in an openable and closable manner on platen glass on which a document is loaded, with respect to the platen glass document pressing.

BACKGROUND ART

An image reader includes: a reading section which reads an image of a document; and a document pressing section which is supported at the reading section in an openable and closable manner. While a document is loaded on platen glass of the reading section and the document pressing section is closed, the document is read by the reading section through the platen glass with the aforementioned document pressing section serving as a document pressing member.

In Patent Document 1, a document conveyance section (document pressing section) is provided in an operable and closable manner with respect to a reading section, and in a state in which a document is loaded on platen glass of the reading section and the document conveyance section is closed, the document is read by the reading section. Moreover, position regulation members are provided at four portions which are located on a bottom surface of the document conveyance section but not in a document pressing region. When the document conveyance section is closed, each position regulation member is caused to abut a top surface portion of the reading section removed from the platen glass, thereby regulating a height position of the document conveyance section with respect to the reading section.

Moreover, in Patent Document 2, a document conveyance section (document pressing section) is provided in an openable and closable manner with respect to a reading section, and in a state in which the document conveyance section is closed, a document is read by the reading section while the document is conveyed on platen glass by the document conveyance section. Then a abutting stop member is projected from a document pressing plate of the document conveyance section, and when the document conveyance section is closed, the abutting stop member is caused to abut the platen glass and the document pressing plate is slightly separated from the platen glass, forming a gap for passage and conveyance of the document between the platen glass and the document pressing plate.

PRIOR ART LIST

Patent Document

[Patent Document 1] Japanese Patent Application Laid-open No. 2005-274810
[Patent Document 2] Japanese Patent Application Laid-open No. 2001-242670

SUMMARY OF THE INVENTION

However, as in Patent Document 1, in a case where the position regulation member is provided at the portion not located in the document holding region, when the document conveyance section is opened, each position regulation member located on the bottom surface of the document conveyance section is exposed, which results in poor appearance. Moreover, upon every opening and closing of the document conveyance section, each position regulation member hits the top surface of the reading section, thus causing a scratch on the top surface of the reading section.

Moreover, to cause the abutting stop member to abut the platen glass of the reading section as in Patent Document 2, when the reading section is subjected to impact as a result of rapid closing of the document conveyance section, the entire impact is received by the platen glass through the abutting stop member, which therefore may break the platen glass.

In view of the circumstance described above, the present invention has been made, and it is an object of the invention to, in an image reader, provide favorable appearance even upon closing of a document pressing section, form no scratch on a top surface of a reading section, further avoid breakage of platen glass of the reading section, and further enable accurate positioning of the document pressing section with respect to the reading section.

An image reader according to one aspect of the present invention includes: a reading section having platen glass and reading a document loaded on the platen glass; a document pressing section being supported in an openable and closable manner with respect to the reading section; a document pressing plate being fitted to the document pressing section, and pressing the document on the platen glass when the document pressing section is closed; and a height regulation section being formed in a manner such as to project from an opposing surface of the document pressing section, lying between the opposing surface and the document pressing plate, and being provided at a position overlapping with a region where the platen glass is arranged when the document pressing section is closed.

Moreover, an image forming apparatus according to one aspect of the invention includes: the aforesaid image reader according to the invention; and an image formation section forming, on recording paper, an image of a document read through the reading by the reading section of the image reader.

Advantageous Effects of the Invention

With the present invention, favorable outer appearance is provided even in a state in which the document pressing section of the image reader is opened from the reading section, no scratch is formed on the top surface of the reading section even in a state in which the document pressing section is closed with respect to the reading section, breakage of the platen glass of the reading section is avoided, and further the document pressing section can accurately be positioned with respect to the reading section.

DESCRIPTION OF THE EMBODIMENTS

Hereinafter, an embodiment of the present invention will be described with reference to the drawings.

Figure 1:
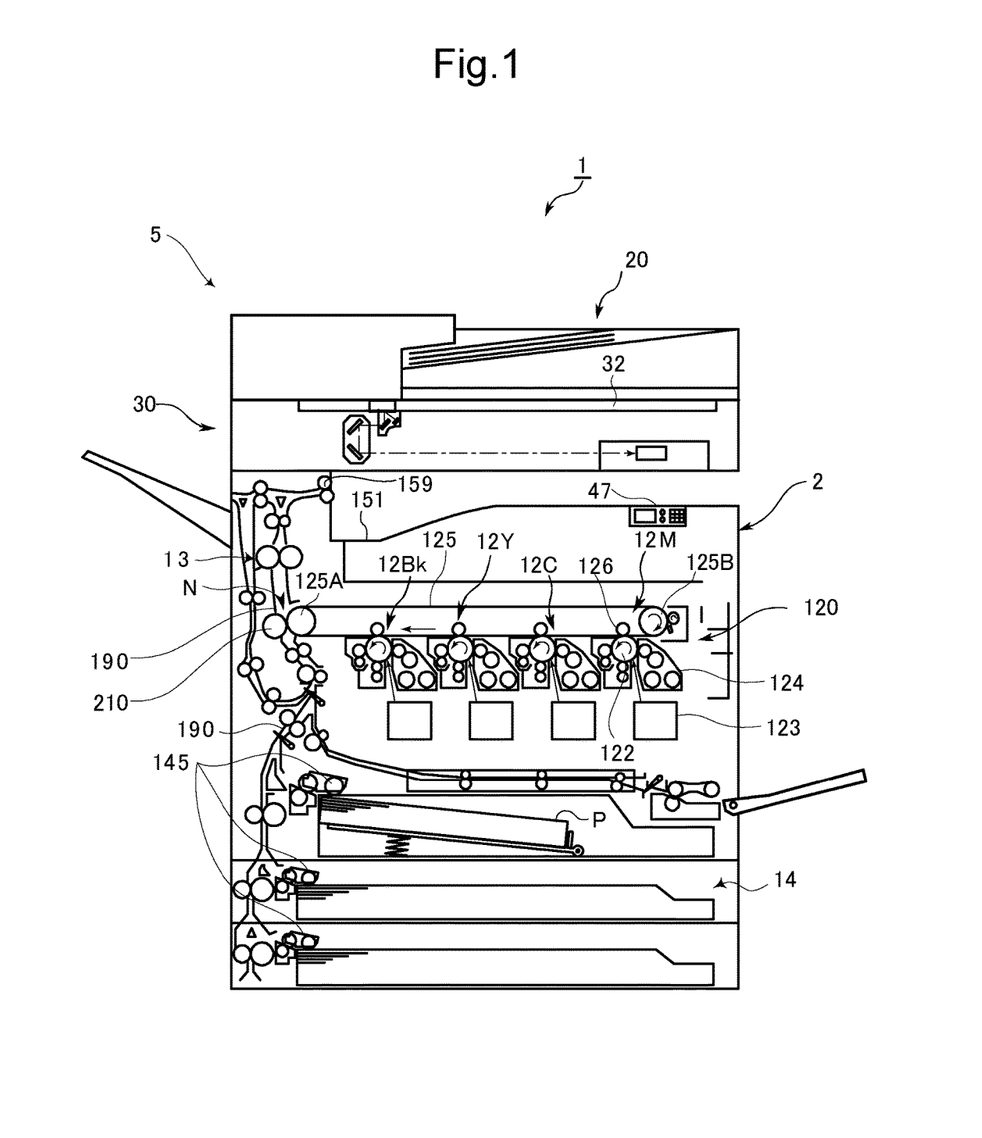
FIG. 1 is a sectional view illustrating an image forming apparatus including an image reader according to one embodiment of the present invention.

FIG. 1 is an elevation sectional view illustrating structures of an image reader and an image forming apparatus according to one embodiment of the invention. The image forming apparatus 1 of this embodiment is a multifunction peripheral combining together, for example, a copy function, a printer function, a scanner function, and a facsimile function. The image forming apparatus 1 includes, in an apparatus main body 2, an operation section 47, an image formation section 120, a fixing section 13, a paper feed section 14, and an image reader (image scanner unit: ISU) 5, etc.

The operation section 47 is operated by a user, and in accordance with this operation, receives, for example, execution instructions for image formation operation, image reading operation, etc.

To perform the image reading operation, the image reader 5 optically reads an image of a document to generate image data. The image data generated by the image reader 5 is saved into, for example, a built-in HDD or a network-connected computer.

To perform the image formation operation, based on, for example, the image data generated through the aforementioned image reading operation, image data received from a user terminal device such as a network-connected computer or a smartphone, or the image data stored in the built-in HDD, the image formation section 120 forms a toner image on recording paper P as a recording medium supplied from the paper feed section 14.

The image formation section 120 includes: a magenta image formation unit 12M, a cyan image formation unit 12C, a yellow image formation unit 12Y, and a black image formation unit 12Bk. Each of the image formation units 12M, 12C, 12Y, and 12Bk includes: a photoconductive drum 122, a charging device which uniformly charges a surface of the photoconductive drum 122; an exposure device (laser scanning unit: LSU) 123 which exposes the surface of the photoconductive drum 122 to form an electrostatic latent image thereon; a developing device 124 which develops the electrostatic latent image on the surface of the photoconductive drum 122 into a toner image by using a toner; and a primary transfer roller 126.

To perform color printing, in each of the image formation units 12M, 12C, 12Y, and 12Bk, the surface of the photoconductive drum 122 is uniformly charged and then exposed, an electrostatic latent image corresponding to an image of a color component is formed on the surface of the photoconductive drum 122, the electrostatic latent image on the surface of the photoconductive drum 122 is developed, a toner image of the color component is formed on the photoconductive drum 122, and the toner image is primarily transferred by the primary transfer roller 126 onto an intermediate transfer belt 125 stretched around a driving roller 125A and a driven roller 125B.

The intermediate transfer belt 125 has an image carrying surface which is set on an outer circumferential surface of the intermediate transfer belt 125 and on which a toner image is transferred, and is driven by the driving roller 125A while abutting a circumferential surface of the photoconductive drum 122. The intermediate transfer belt 125 endlessly runs between the driving roller 125A and the driven roller 125B while synchronizing with each photoconductive drum 122.

The toner images of the respective color components to be transferred onto the intermediate transfer belt 125 are superposed on each other on the intermediate transfer belt 125 through transfer timing adjustment, turning into a color toner image. A secondary transfer roller 210 causes the color toner image formed on a surface of the intermediate transfer belt 125 to be secondarily transferred onto the recording paper P conveyed from the paper feed section 14 through a conveyance path 190 at a nip part N formed between the secondary transfer roller 210 and the intermediate transfer belt 125.

Then the recording paper P is heated and pressurized at the fixing section 13, whereby the toner image formed on the recording paper P is fixed through thermal compression, and the recording paper P is further discharged onto a discharge tray 151 through a discharge roller pair 159.

The paper feed section 14 includes a plurality of paper feed cassettes. Upon specification of any of the paper feed cassettes through operation of the operation section 47 by the user, a pickup roller 145 of the aforementioned paper feed cassette is driven into rotation, and the recording paper P is conveyed and supplied to the conveyance path 190.

Figure 2:
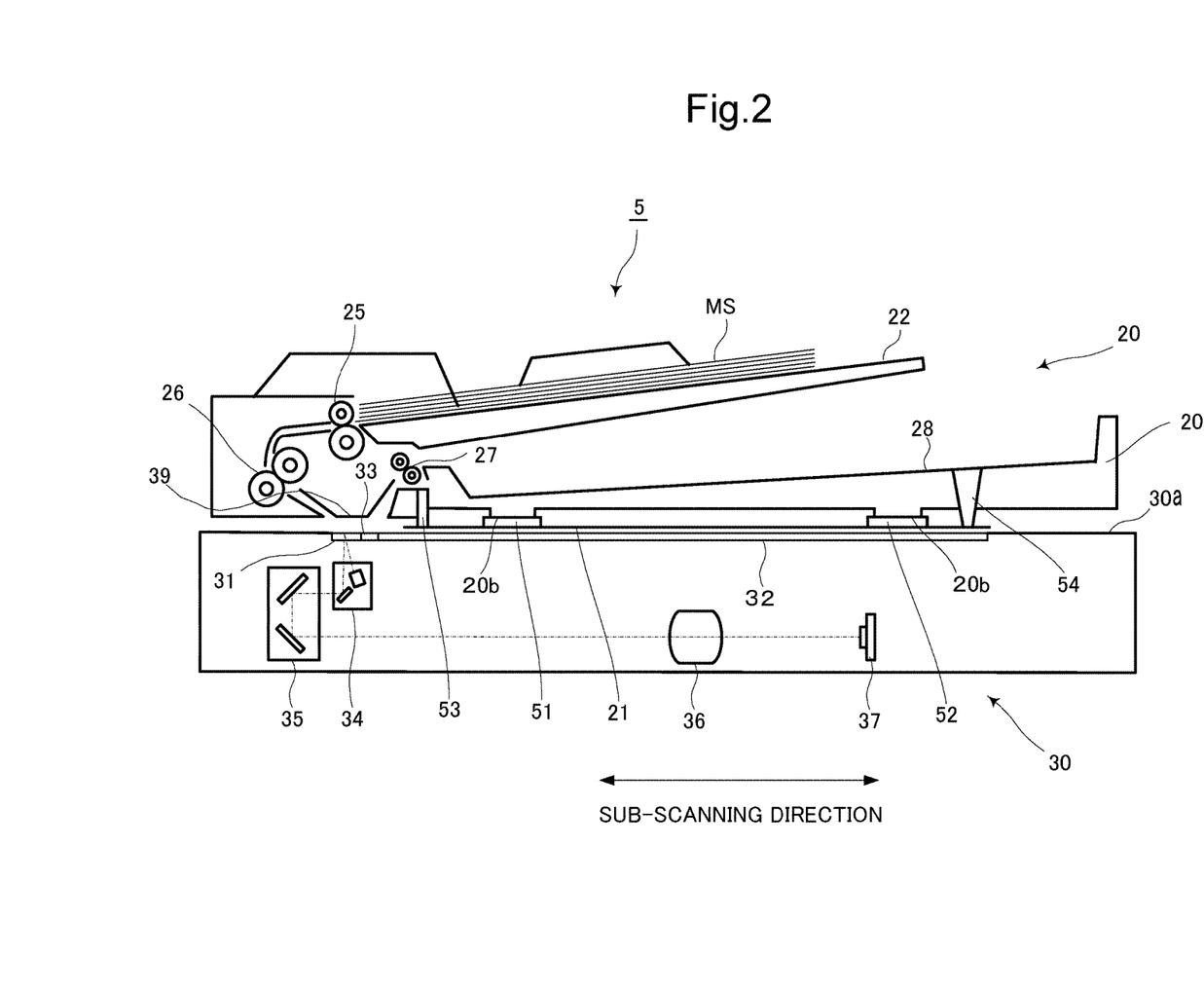
FIG. 2 is a sectional view illustrating the image reader in a state in which a document conveyance section is closed.
Figure 3:
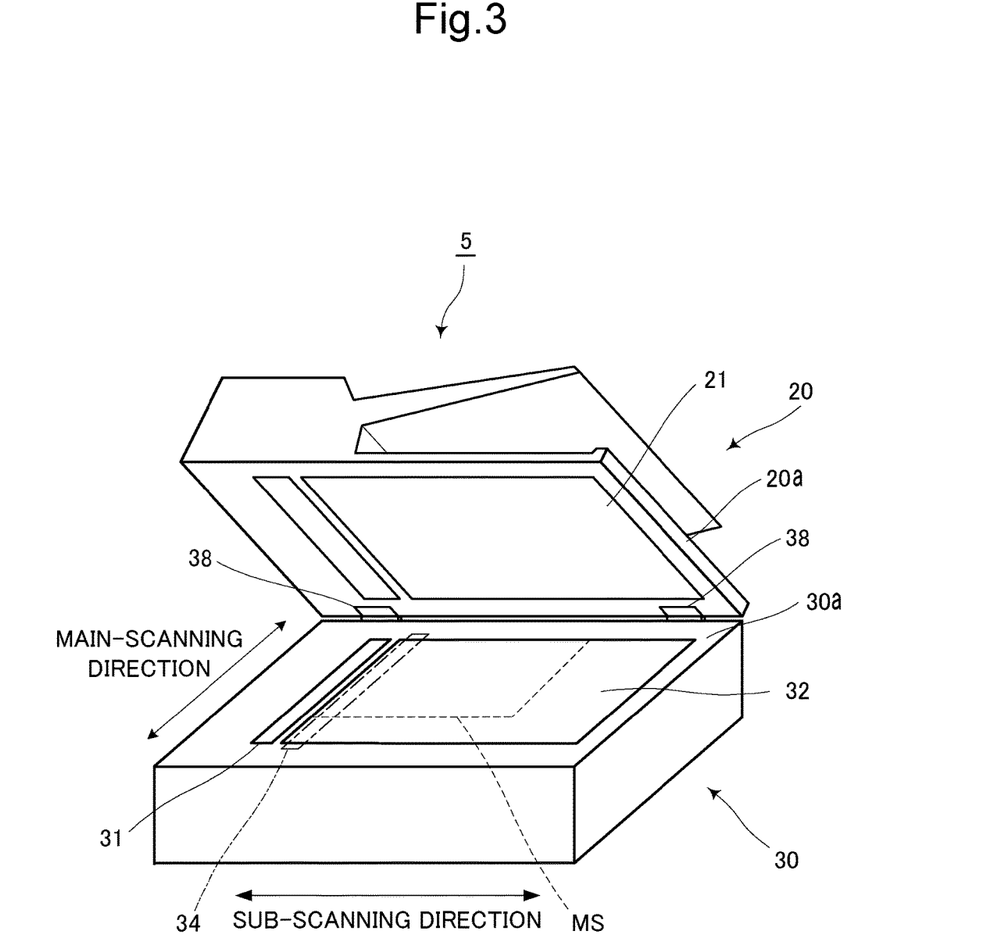
FIG. 3 is a perspective view illustrating outer appearance of the image reader in a state in which the document conveyance section is open.

Next, schematic configuration of the image reader 5 will be described. FIG. 2 is a sectional view schematically illustrating mechanical configuration of the image reader 5 in a state in which a document conveyance section 20 is closed. FIG. 3 is a perspective view schematically illustrating outer appearance of the image reader 5 in a state in which the document conveyance section 20 is opened.

As illustrated in FIGS. 2 and 3, the image reader 5 includes the document conveyance section 20 and a reading section 30. The document conveyance section 20 includes: a document pressing plate 21, a document feed tray 22, a pickup roller 25, a conveyance roller 26, a paper discharge roller 27, a document discharge tray 28, etc. The document conveyance section 20 is one example of a document pressing section in the scope of the claims. The reading section 30 includes: first platen glass 31, second platen glass 32, a white reference plate 33, a carriage 34, an optical system unit 35, a condensing lens 36, a charge coupled device (CCD) sensor 37, etc.

Here, two hinges 38 are provided at one end part of a top surface 30a of the reading section 30 separately from each other. The document conveyance section 20 is pivotably supported by the hinges 38 in an openable and closable manner, which permits the user to perform operation of opening and closing the document conveyance section 20.

When the document conveyance section 20 is opened, the first platen glass 31 and the second platen glass 32 of the reading section 30 are opened, permitting a document MS to be loaded on the second platen glass 32 of the reading section 30, and upon closing of the document conveyance section 20 thereafter, the document MS on the second platen glass 32 is pressed by the document pressing plate 21 of the document conveyance section 20.

Moreover, upon loading of the document MS on the document feed tray 22 in a state which the document conveyance section 20 is closed, the document MS is drawn out from the document feed tray 22 by the pickup roller 25, the document is conveyed by the conveyance roller 26 to pass on the first platen glass 31 of the reading section 30, and then the document is discharged onto the document discharge tray 28 by the paper discharge roller 27.

In the reading section 30, the document MS is illuminated through the first platen glass 31 and the second platen glass 32 by a light source of the carriage 34, light reflected thereon is reflected on the carriage 34 and a plurality of mirrors of the optical system unit 35 and guided to the CCD sensor 37 through the condensing lens 36, and the document MS is read by the CCD sensor 37. Consequently, the document MS passing on the first platen glass 31 or the document MS loaded on the second platen glass 32 is read.

Next, configuration for positioning the document conveyance section 20 with respect to the reading section 30 in a height direction will be described.

Figure 4:
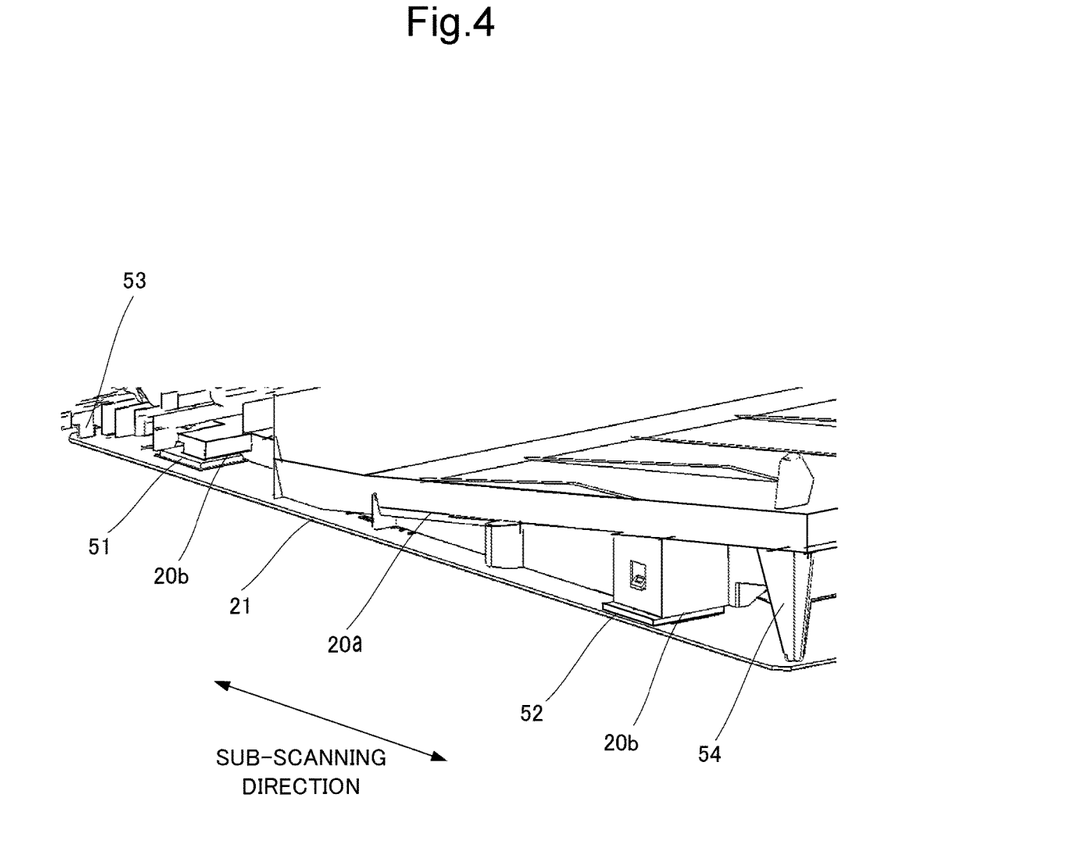
FIG. 4 is a perspective view illustrating an inner structure of surroundings of a bottom part of the document conveyance section.
Figure 5:
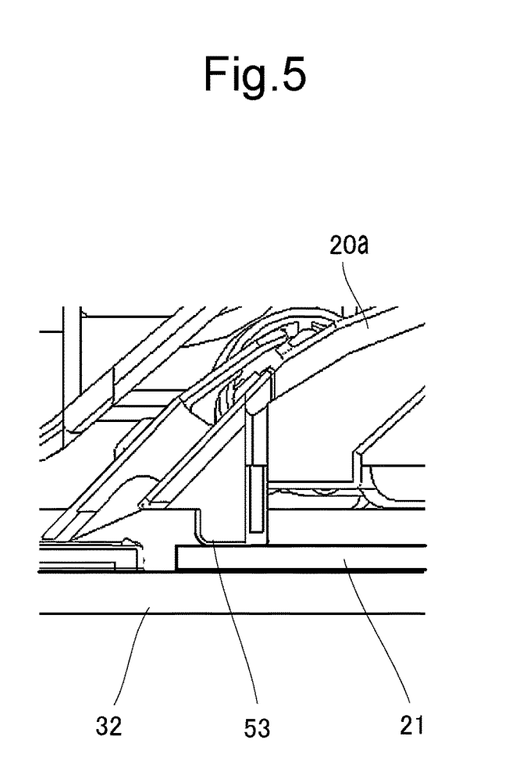
FIG. 5 is a sectional view from a side, illustrating surroundings of a height regulation section in the document conveyance section.
Figure 6:
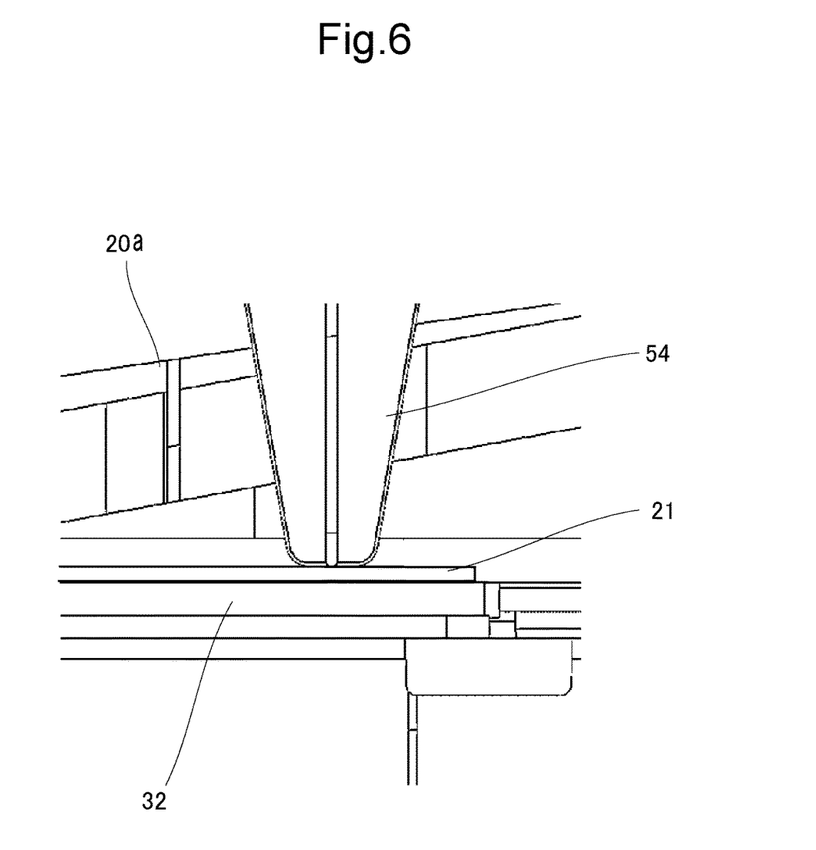
FIG. 6 is a sectional view from a side, illustrating surroundings of another height regulation section in the document conveyance section.

FIG. 4 is a perspective view illustrating an inner structure of surroundings of a bottom part of the document conveyance section 20. FIG. 5 is a sectional view from a side, illustrating surroundings of a height regulation section 53 in the document conveyance section 20. FIG. 6 is a sectional view from the side, illustrating surroundings of another height regulation section 54 in the document conveyance section 20.

As illustrated in FIGS. 4 through 6, the document pressing plate 21 has a thin plate-like shape with stiffness. A white sheet is attached to a lower surface of the document pressing plate 21 or the aforementioned surface is white-painted. Moreover, attached to a lower surface 20b of the main body part 20a of the document conveyance section 20 are a plurality of foamed synthetic resin members 51 and 52, on each lower surface of which the document pressing plate 21 is attached and supported. Therefore, the document pressing plate 21 is fitted to the main body part 20a of the document conveyance section 20 via the foamed synthetic resin members 51 and 52. Specifically, the foamed synthetic resin members 51 and 52 are provided on a plurality of positions of the lower surface 20b (a part of an opposing surface in the scope of the claims) of the main body part 20a in the document conveyance section 20, the document pressing plates 21 are locally pressed by the foamed synthetic resin members 51 and 52.

Moreover, the plurality of height regulation sections 53 and 54 are projected downward from the main body part 20a of the document conveyance section 20. Note that the height regulation sections 53 and 54 are provided at a plurality of (two in this embodiment) portions in a main scanning direction.

In FIGS. 4 through 6, the document conveyance section 20 is closed, and the document pressing plate 21 is brought into pressure-contact with the second platen glass 32 by a load of the document conveyance section 20. Moreover, a lower end of each of the height regulation sections 53 and 54 is pressed against the second platen glass 32 with the document pressing plate 21 in between.

Simply illustrated here in FIG. 2 are the main body part 20a of the document conveyance section 20, the document pressing plate 21, the foamed synthetic resin members 51 and 52, and the height regulation sections 53 and 54.

As is clear from FIG. 2, the foamed synthetic resin member 51 is arranged on a one-end side of the document pressing plate 21 in a sub-scanning direction, and is arranged near each of both sides of the document pressing plate 21 in the main-scanning direction (the foamed synthetic resin member 51 on one of the sides in the main-scanning direction is not illustrated). Moreover, the foamed synthetic resin member 52 is arranged on another end side of the document pressing plate 21 in the sub-scanning direction, and is arranged near each of the both sides of the document pressing plate 21 in the main-scanning direction (the foamed synthetic resin member 52 on one of the sides in the main-scanning direction is not illustrated). Therefore, the four foamed synthetic resin members 51 and the four foamed synthetic resin members 52 are fitted to their respective portions on the lower surface 20b of the main body part 20a of the document conveyance section 20. The document pressing plate 21 is attached and supported on bottom surfaces of the foamed synthetic resin members 51 and 52.

The foamed synthetic resin members 51 and 52 have elasticity such that when the document conveyance section 20 is not in a closed state but in an uncompressed, extended state not subjected to pressing by the second platen glass 32, the foamed synthetic resin members 51 and 52 have a length from the lower surface 20b of the main body part 20a set longer than the height regulation sections 53 and 54, and when the document conveyance section 20 is in a closed state subjected to the pressing by the second platen glass 32, the foamed synthetic resin members 51 and 52 can shrink towards the main body part 20a more than the height regulation sections 53 and 54.

The height regulation section 53 has a shape projected from the main body part 20a of the document conveyance section 20, and is located between the main body part 20a and the document pressing plate 21. When the document conveyance section 20 is closed with respect to the reading section 30, the height regulation section 53 is provided at a position overlapping with a region where the second platen glass 32 is arranged.

Moreover, the height regulation section 53 is arranged closer to one end of the document pressing plate 21 in the sub-scanning direction than the foamed synthetic resin member 51, and is arranged near each of the both sides of the document pressing plate 21 in the main-scanning direction (the height regulation section 53 on one of the sides in the main-scanning direction is not illustrated). The height regulation section 54 is arranged closer to another end of the document pressing plate 21 in the sub-scanning direction than the foamed synthetic resin member 52, and is arranged near each of the both sides of the document pressing plate 21 in the main-scanning direction (the height regulation section 54 on one of the sides in the main-scanning direction is not illustrated). Therefore, the four height regulation sections 53 and the four height regulation sections 54 are provided at their respective portions of the main body part 20a of the document conveyance section 20.

Moreover, as is clear from FIGS. 2 through 6, in each of the main-scanning direction and the sub-scanning direction, each of the height regulation sections 53 and 54 is arranged at a position located on an inner side of the document pressing plate 21 and a position overlapping with the region of the second platen glass 32 when the document conveyance section 20 is in a closed state.

Note that the document pressing plate 21 and the second platen glass 32 have rectangular shapes of substantially the same size.

Moreover, the second platen glass 32 is one example of platen glass in the scope of the claims, and each of the foamed synthetic resin members 51 and 52 is one example of an elastic member in the scope of the claims.

Next, functions of the document pressing plate 21, each of the foamed synthetic resin members 51 and 52, and each of the height regulation sections 53 and 54 involved in opening and closing of the document conveyance section 20 will be described.

Figure 7A:
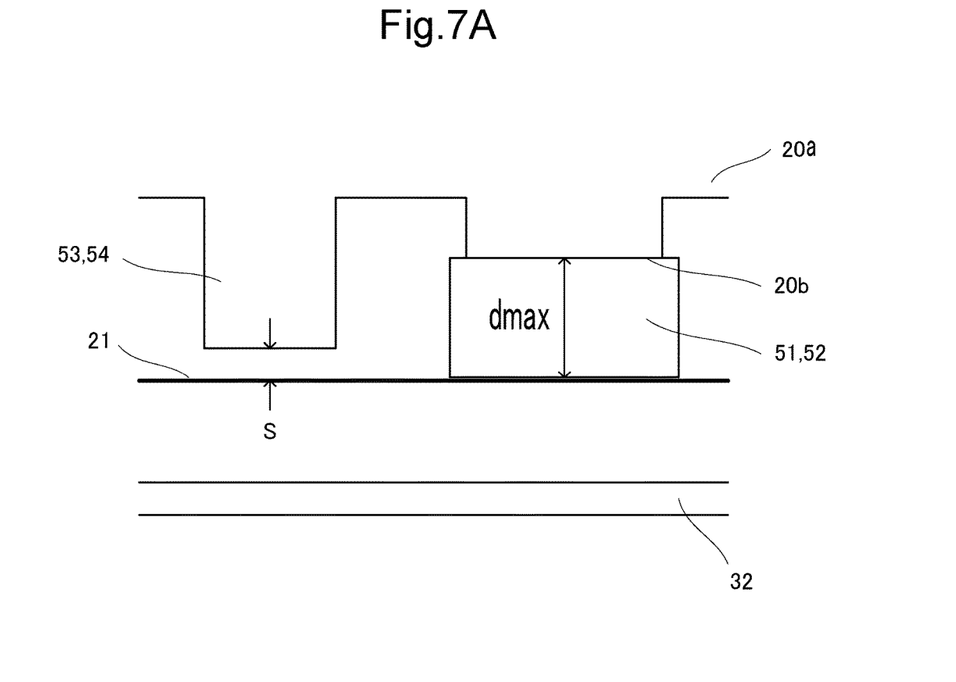
FIG. 7A is a view schematically illustrating a document pressing plate, foamed synthetic resin members, and height regulation sections when the document conveyance section is opened.
Figure 7B:
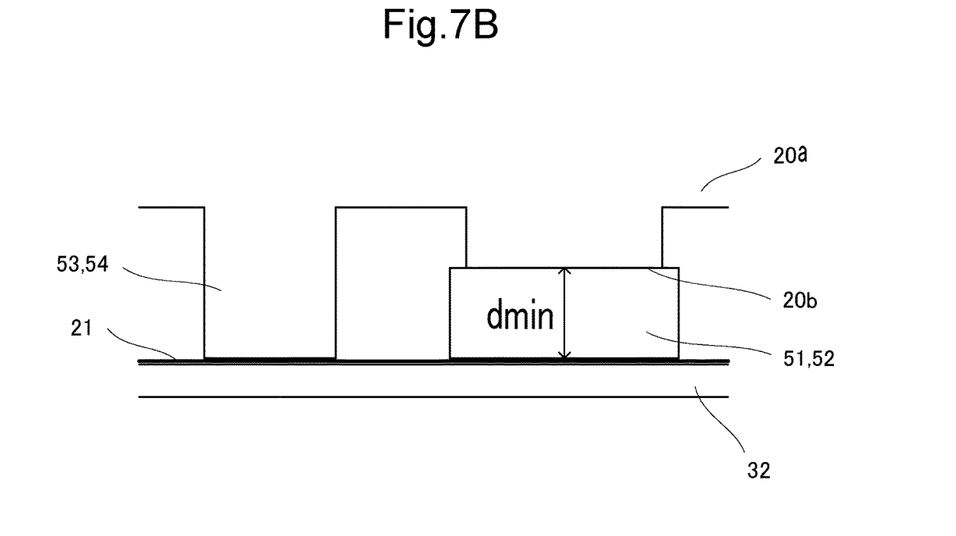
FIG. 7B is a view schematically illustrating the document pressing plate, the foamed synthetic resin members, and the height regulation sections when the document conveyance section is closed.

FIG. 7A is a view schematically illustrating the document pressing plate 21, the foamed synthetic resin members 51 and 52, and the height regulation sections 53 and 54 when the document conveyance section 20 is opened, and FIG. 7B is a view schematically illustrating the aforementioned components when the document conveyance section 20 is closed.

As illustrated in FIG. 7A, when the document conveyance section 20 is open, the document pressing plate 21 is separated from the second platen glass 32, and thus the document pressing plate 21 falls down by its own weight, turning the foamed synthetic resin members 51 and 52 into an uncompressed state, whereby a thickness of each of the foamed synthetic resin members 51 and 52 becomes a maximum thickness dmax. When each of the foamed synthetic resin members 51 and 52 has turned into the uncompressed state, a lower end of each of the height regulation sections 53 and 54 separates from the document pressing plate 21 by a distance S.

Moreover, as illustrated in FIG. 7B and FIG. 2, upon closing of the document conveyance section 20, the document pressing plate 21 abuts the second platen glass 32, the foamed synthetic resin members 51 and 52 are compressed between the main body part 20a of the document conveyance section 20 and the document pressing plate 21, whereby the thickness of each of the foamed synthetic resin members 51 and 52 becomes a minimum thickness dmin under this circumstance. Along with this, the lower end of each of the height regulation sections 53 and 54 approaches and abuts the document pressing plate 21, and the lower end of each of the height regulation sections 53 and 54 is further pressed against the second platen glass 32 with the document pressing plate 21 in between. At this point in time, where a thickness change Δd of each of the foamed synthetic resin members 51 and 52 is (maximum thickness dmax minus minimum thickness dmin), the thickness change Δd becomes substantially equal to the distance S.

Then upon pressing of the lower end of each of the height regulation sections 53 and 54 against the second platen glass 32 with the document pressing plate 21 in between, the fall of the main body part 20a of the document conveyance section 20 is regulated, and the document conveyance section 20 and the document pressing plate 21 thereof in particular are accurately positioned in a height direction.

As described above, when the document conveyance section 20 is in a closed state, the lower end of each of the height regulation sections 53 and 54 is pressed against the second platen glass 32 with the document pressing plate 21 in between in this embodiment. Therefore, while the document on the second platen glass 32 is pressed against the second platen glass 32 with a fixed pressure by the document pressing plate 21, positions of the document conveyance section 20 and the document pressing plate 21 thereof in particular in the height direction can accurately be positioned with respect to the second platen glass 32. When the document conveyance section 20 turns into a closed state and the lower end of each of the height regulation sections 53 and 54 is pressed against the second platen glass 32 with the document pressing plate 21 in between as described above, a distance between the first platen glass 31 and a platen member 39 which is provided on a main body part 20a side of the document conveyance section 20 opposing the first platen glass 31 for the purpose of reading the document MS being conveyed is kept at a predefined fixed distance. The first platen glass 31 and the second platen glass 32 are set at the same height. Thus, when the document conveyance section 20 is in a closed state, the document conveyance section 20 is also accurately positioned in the height direction with respect to the first platen glass 31, which permits reliable formation of a given gap for permitting conveyance and passage of the document MS between the document conveyance section 20 and the first platen glass 31.

Moreover, when the document conveyance section 20 is closed, the lower end of each of the height regulation sections 53 and 54 is pressed against the second platen glass 32 with the document pressing plate 21 in between, so that the lower end of each of the height regulation sections 53 and 54 does not make direct contact with a top surface of the reading section 30, which is therefore not scratched. Further, the document pressing plate 21 diffuses the load of the document conveyance section 20 received by the lower end of each of the height regulation sections 53 and 54 to act on the second platen glass 32, so that the load of the document conveyance section 20 is not concentrated on part of the second platen glass 32 and the second platen glass 32 is saved from breakage.

Moreover, since each of the height regulation sections 53 and 54 is arranged on an inner side of the document pressing plate 21, when the document conveyance section 20 is opened, each of the height regulation sections 53 and 54 is covered by the document pressing plate 21 and is thus not viewed, which improves the outer appearance.

Moreover, as another embodiment, out of the height regulation sections 53 and 54, the height regulation section 54 which is located at a position separated in the aforementioned sub-scanning direction from the hinge 38 serving as a pivotably supporting point upon turning of the document conveyance section 20 may be formed into a shape of a longer length from the lower surface 20b than that of the height regulation section 53. In this case, when the document conveyance section 20 is not in a closed state but in an uncompressed, extended state not subjected to pressing by the second platen glass 32, the foamed synthetic resin members 51 and 52 have lengths from the lower surface 20b of the main body part 20a set longer than the height regulation section 54.

Further, also in another embodiment described above, the foamed synthetic resin member 52 provided near the height regulation section 54 may be formed of a raw material with higher flexibility than that of the foamed synthetic resin member 51.

Further, in another embodiment described above, only one height regulation section 54 may be set in the main-scanning direction.

Figure 8:
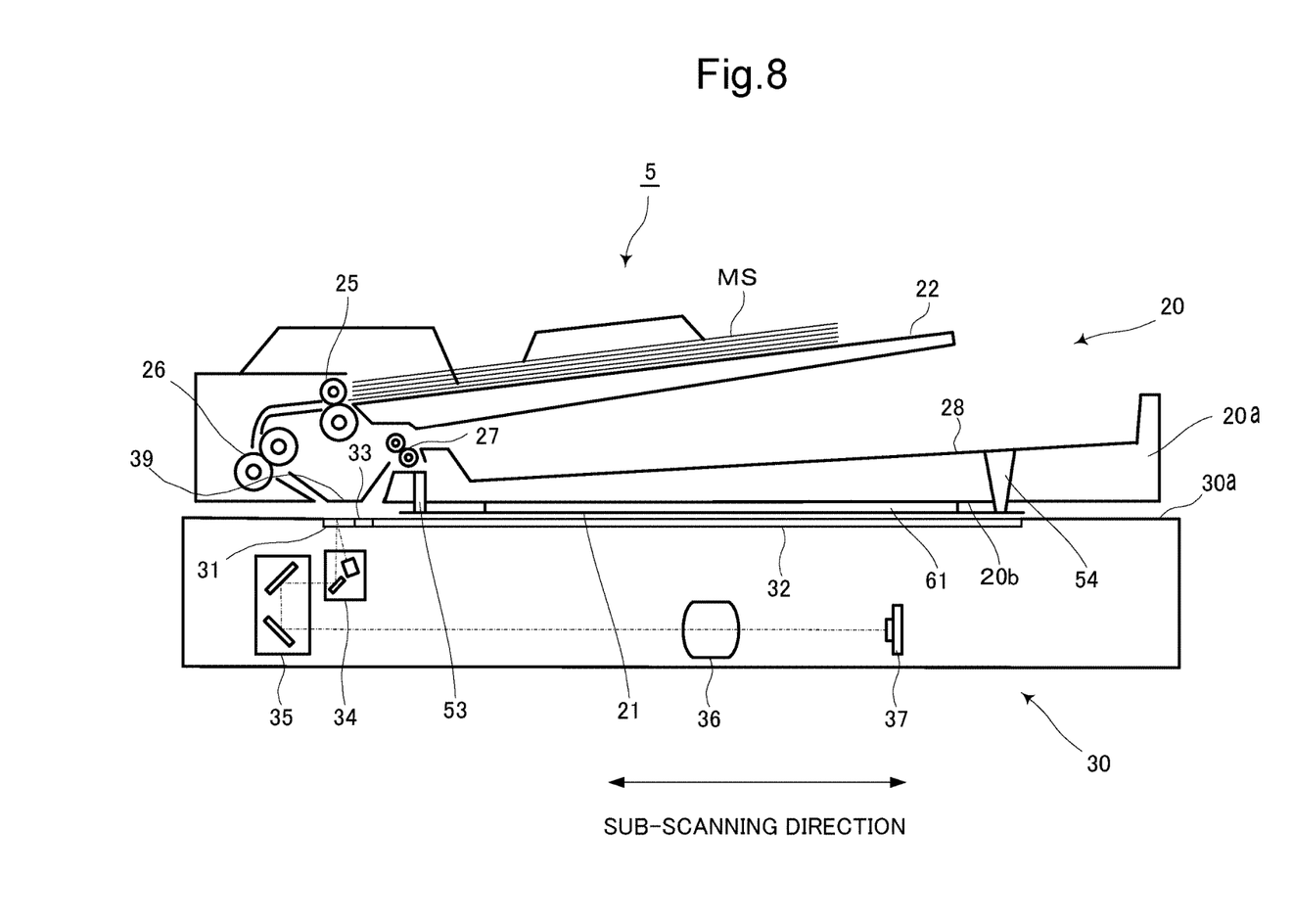
FIG. 8 is a sectional view illustrating a modified example of the image reader.

FIG. 8 illustrates a modified example of the image reader 5. In this modified example, the lower surface 20b of the main body part 20a of the document conveyance section 20 is formed into a wide flat surface, to which a single foamed synthetic resin seal 61 is attached. The foamed synthetic resin seal 61 is smaller than the second platen glass 32, and each of the height regulation sections 53 and 54 is arranged on an outer side of the foamed synthetic resin seal 61. For example, the foamed synthetic resin seal 61 as an elastic member is provided on the lower surface 20b in a size such that the lower surface 20b of the main body part 20a of the document conveyance section 20 extends across an entire region opposing the document pressing plate 21.

When the document conveyance section 20 is open, the document pressing plate 21 falls down due to its own weight, turning the foamed synthetic resin seal 61 into an uncompressed state, whereby the lower end of each of the height regulation sections 53 and 54 is separated from the document pressing plate 21.

Moreover, upon closing of the document conveyance section 20, the load of the document conveyance section 20 is imposed on the foamed synthetic resin seal 61 located between the main body part 20a of the document conveyance section 20 and the document pressing plate 21, compressing the foamed synthetic resin seal 61, whereby the lower end of each of the height regulation sections 53 and 54 is pressed against the second platen glass 32 with the document pressing plate 21 in between. Therefore, the same effects as those of the embodiment described above are also provided in this modified example.

Moreover, configuration and processing of the embodiment and modified example described above with reference to FIGS. 1 through 8 are each just one example of the invention, and the invention is not limited in any way to the configuration and processing.

The invention claimed is:

1. An image reader comprising:
a reading section having platen glass and reading a document loaded on the platen glass;
a document pressing section being supported in an openable and closable manner with respect to the reading section;
a document pressing plate being fitted to the document pressing section, and pressing the document on the platen glass when the document pressing section is closed;
a height regulation section being formed in a manner such as to project from an opposing surface of the document pressing section facing the platen glass, the height regulation section lying between the opposing surface and the document pressing plate and being provided at a position overlapping with a region where the platen glass is arranged when the document pressing section is closed; and
an elastic member being provided on the opposing surface of the document pressing section, wherein
the document pressing plate is fitted to the document pressing section with the elastic member in between,
the elastic member has elasticity such that the elastic member has a length from the opposing surface set longer than the height regulation section in an extended state, and when the document pressing section is closed and subjected to pressing by the platen glass, the elastic member is capable of shrinking closer towards the opposing surface than the height regulation section,
the document pressing section opens and closes in a manner such as to turn in directions approaching and separating from the platen glass, with a turning mechanism, which is provided at one end part in a sub-scanning direction, provided as a pivotably supporting point,
one of the height regulation section is respectively provided at different positions in the sub-scanning direction, and out of the two height regulation sections provided at the different positions in the sub-scanning direction, the one height regulation section located at the position separated from the pivotably supporting point in the sub-scanning direction is formed to have a longer length from the opposing surface than the another height regulation section, and
in an uncompressed, extended state in which the document pressing section is not closed and is not subjected to the pressing by the platen glass, the elastic member has a longer length from the opposing surface than the one height regulation sections.

2. The image reader according to claim 1, wherein
when the document pressing section is opened, the elastic member is not subjected to the pressing by the platen glass, turning into the extended state to separate the document pressing plate from the height regulation section, and
when the document pressing plate is closed, the document pressing plate is pressed by the platen glass and the elastic member is compressed between the document pressing plate and the opposing surface, whereby the document pressing plate abuts the height regulation section.

3. The image reader according to claim 1, wherein
a plurality of the elastic members are provided at various parts of the opposing surface in the document pressing section, locally pressing the document pressing plate.

4. The image reader according to claim 1, wherein
the elastic member is provided on the opposing surface in a size such that the opposing surface of the document pressing section extends across an entire region opposing the document pressing plate.

5. The image reader according to claim 1, wherein
the height regulation section is arranged closer to an end part side of the document pressing plate in the sub-scanning direction than the elastic member.

6. The image reader according to claim 1, wherein
the elastic member provided around the one height regulation section is formed of a raw material with higher flexibility than the elastic member provided around the another height regulation section.

7. The image reader according to claim 1, wherein
the one height regulation section is provided only in one in a main-scanning direction.

8. The image reader according to claim 1, wherein
a plurality of the one height regulation sections and a plurality of the another height regulation sections are provided in the main-scanning direction.

9. An image forming apparatus, comprising:
the image reader according to claim 1; and
an image formation section forming, on recording paper, an image of a document read through the reading by the reading section of the image reader.

* * * * *